US008582973B2

(12) United States Patent
Takahashi et al.

(10) Patent No.: US 8,582,973 B2
(45) Date of Patent: Nov. 12, 2013

(54) DATA COMMUNICATION APPARATUS, ELECTRONIC CAMERA, AND DATA COMMUNICATION SYSTEM

(75) Inventors: Isao Takahashi, Koshigaya (JP); Tetsuya Yamamoto, Hasuda (JP)

(73) Assignee: Nikon Corporation, Tokyo (JP)

( * ) Notice: Subject to any disclaimer, the term of this patent is extended or adjusted under 35 U.S.C. 154(b) by 1281 days.

(21) Appl. No.: 11/990,020

(22) PCT Filed: Sep. 13, 2006

(86) PCT No.: PCT/JP2006/318165
§ 371 (c)(1),
(2), (4) Date: Feb. 5, 2008

(87) PCT Pub. No.: WO2007/032394
PCT Pub. Date: Mar. 22, 2007

(65) Prior Publication Data
US 2009/0142068 A1    Jun. 4, 2009

(30) Foreign Application Priority Data

Sep. 13, 2005    (JP) .................................. 2005-265127

(51) Int. Cl.
*H04B 10/00* (2013.01)
*G03B 19/00* (2006.01)

(52) U.S. Cl.
USPC ............ 398/118; 398/140; 398/172; 396/429

(58) Field of Classification Search
USPC ........................... 398/118, 140, 172; 396/429
See application file for complete search history.

(56) References Cited

U.S. PATENT DOCUMENTS

| 5,519,527 A * | 5/1996 | Panton ......................... 398/117 |
| 7,415,212 B2 * | 8/2008 | Matsushita et al. ........... 398/140 |
| 2001/0011308 A1 * | 8/2001 | Clark et al. .................... 710/20 |
| 2007/0250593 A1 * | 10/2007 | Sikdar et al. .................. 709/217 |

FOREIGN PATENT DOCUMENTS

| JP | A-4-123674 | 4/1992 |
| JP | A-2001-337380 | 12/2001 |
| JP | A-2002-073565 | 3/2002 |
| JP | A-2002-259332 | 9/2002 |
| JP | A-2004-140796 | 5/2004 |
| JP | A-2004-246274 | 9/2004 |
| JP | A-2004-328288 | 11/2004 |
| JP | 2005150895 | * 6/2005 |
| JP | A-2005-150895 | 6/2005 |
| JP | A-2005-522089 | 7/2005 |
| WO | WO 03/084102 A1 | 10/2003 |

OTHER PUBLICATIONS

Japanese Office Action dated Apr. 12, 2011 for Japanese Patent Application No. 2007-535511 (with translation).
Oct. 25, 2011 Office Action issued in Japanese Patent Application No. 2007-535511 (with translation).
Jan. 15, 2013 Office Action issued in Japanese Patent Application No. 2012-013468 (with translation).

* cited by examiner

*Primary Examiner* — Nathan Curs
(74) *Attorney, Agent, or Firm* — Oliff & Berridge, PLC

(57) ABSTRACT

A data communication apparatus comprises a storage unit that stores network connection information required for establishing a connection via a network with an external device, a light emission element that emits light, a light emission control unit that converts the network connection information into an optical signal and emits the optical signal from the light emission element by controlling an operation of the light emission element based upon the network connection information stored in the storage unit, and a reception unit that receives data transmitted from the external device via the network.

5 Claims, 5 Drawing Sheets

FIG.5

| PRIORITY ORDER | CONNECTION METHOD | CONNECTION INFORMATION |
|---|---|---|
| 1 | FTP CONNECTION | IP ADDRESS, USER NAME |
| 2 | UTILIZATION OF DATA STORAGE SERVICE | URL, USER NAME |
| 3 | USB CONNECTION | USB VERSION |
| 4 | VISIBLE LIGHT COMMUNICATION | — |

# DATA COMMUNICATION APPARATUS, ELECTRONIC CAMERA, AND DATA COMMUNICATION SYSTEM

TECHNICAL FIELD

The present invention relates to a data communication apparatus that transmits and receives data via a network, and to an electronic camera and a data communication system.

BACKGROUND ART

From the past, a data communication system has been known in which an electronic camera and an external device are connected together with a communication cable such as a USB cable or the like, and in which image data that is photographed by the electronic camera and is stored upon a recording medium within the electronic camera is transferred to the external device. This type of data communication system is set up by connecting together the electronic camera and a personal computer (hereinafter termed a "PC"), and makes it possible to transmit image data created by the electronic camera to the PC and to display the image upon a display monitor of the PC. Furthermore, by connecting together the electronic camera and a printer, it is possible to transfer image data created by the electronic camera to the printer, and to print out the image with the printer.

On the other hand, the development of electronic cameras equipped with wireless communication functionality is also proceeding rapidly. A data communication system is also proposed in which an electronic camera of this type is connected with an external device via a network by utilizing a wireless LAN. According to this type of data communication system, it becomes possible to transmit image data created by the electronic camera to an external device such as a PC or a printer or the like via the network.

However, for such transmission of image data via a network to an external device that is specified from the electronic camera, it is necessary for the electronic camera to be able to recognize the external device that is the destination for transmission over the network. Due to this, it is necessary to set network connection information for the external device that is to be the destination for transmission of the image data, such as its IP address or the like, into the electronic camera that is the transmission side for the image data.

Accordingly, in order to perform this type of setting, it has been considered to connect together the electronic camera and the PC or the like via a communication cable, and to transmit the network connection information for the external device to the electronic camera by utilizing this communication cable. Or it has also been considered to record the network connection information for the external device upon a memory card, and to set this network connection information into the electronic camera by inserting this memory card into the electronic camera. (For example, refer to Patent Document #1.)
Patent Document #1: Japanese Laid-Open Patent Publication 2004-328288.

DISCLOSURE OF THE INVENTION

Problems to be Solved by the Invention

However, if the network connection information is transmitted to the electronic camera via a communication cable, it is necessary to insert the terminals of this communication cable into the connectors of the external device and the electronic camera, that involves considerable trouble. Furthermore, even if the network connection information is transmitted to the electronic camera via a memory card, still the insertion and removal of the memory card into and out from the external device and the electronic camera must be performed, that likewise entails considerable trouble. This type of problem is not limited to connection between an electronic camera and an external device; it can occur in a similar manner in connection between any plurality of data communication apparatuses that are connected together via a network.

Accordingly, the object of the present invention is to provide a data communication apparatus and a data communication system that can transmit and receive network connection information between a plurality of data communication apparatuses with simple operation.

Means for Solving the Problems

A data communication apparatus according to a first aspect of the present invention comprises a storage unit that stores network connection information required for establishing a connection via a network with an external device, a light emission element that emits light, a light emission control unit that converts the network connection information into an optical signal and emits the optical signal from the light emission element by controlling an operation of the light emission element based upon the network connection information stored in the storage unit, and a reception unit that receives data transmitted from the external device via the network.

In the data communication apparatus according to the first aspect, the network communication information may include, at least, recognition information for being recognized from the external device.

In the data communication apparatus according to the first aspect, the light emitted from the light emission element may be visible light.

An electronic camera according to the first aspect of the present invention comprises an image-capturing unit that creates image data, a storage unit that stores image data created by the image-capturing unit and network connection information required for establishing a connection via a network with an external device, a light emission element that emits light, a light emission control unit that converts the network connection information into an optical signal and emits the optical signal from the light emission element by controlling an operation of the light emission element based upon the network connection information stored in the storage unit, and a transmission and reception unit that receives data transmitted from the external device and transmits image data stored in the storage unit to the external device via the network.

In the electronic camera according to the first aspect, the network communication information may include, at least, recognition information for being recognized from the external device.

In the electronic camera according to the first aspect, light emitted from the light emission element may be visible light.

A data communication apparatus according to a second aspect of the present invention comprises a storage unit that stores network connection information required for establishing a connection via a network with an external device, a transmission unit that transmits the network connection information, and a reception unit that receives data transmitted from the external device via the network; the network connection information includes information for a plurality of connection methods by which connection is possible and setting information for connection by each connection method.

In the data communication apparatus according to the second aspect, the network connection information may include a priority order for the plurality of connection methods.

An electronic camera according to the second aspect of the present invention comprises an image-capturing unit that creates image data, a storage unit that stores image data created by the image-capturing unit and network connection information required for establishing a connection via a network with an external device, a transmission unit that transmits the network connection information, a reception unit that receives data transmitted from the external device via the network, and a transmission and reception unit that receives data transmitted from the external device and transmits image data stored in the storage unit to the external device via the network; the network connection information includes information for a plurality of connection methods by which connection is possible and setting information for connection by each connection method.

A data communication apparatus according to a third aspect of the present invention comprises a light reception element that receives light emitted from an external device, an information acquisition unit that acquires, via the light reception element, network connection information required for establishing a connection via a network, transmitted as an optical signal from the external device, a storage unit that stores the acquired network connection information, and a transmission unit that transmits data to the external device via the network.

In the data communication apparatus according to the third aspect, it may be formed that, after the connection via the network has been established with the external device based upon the network connection information stored in the storage unit, data is transmitted to the external device via the transmission unit.

In the data communication apparatus according to the third aspect, the setting information may include, at least, recognition information for being recognized from the external device.

In the data communication apparatus according to the third aspect, the light received by the light reception element may be visible light.

An electronic camera according to the third aspect of the present invention comprises an image-capturing unit that captures an image of a photographic subject to create image data and receives light emitted from an external device, an information acquisition unit that acquires, via the image-capturing unit, network connection information required for establishing a connection via a network, transmitted as an optical signal from the external device, a storage unit that stores image data created by the image-capturing unit and the acquired network connection information, and a transmission and reception unit that receives data transmitted from the external device and transmits image data stored in the storage unit to the external device via the network.

In the electronic camera according to the third aspect, it may be formed that, after the connection via the network has been established with the external device based upon the network connection information stored in the storage unit, data is transmitted to the external device via the transmission unit.

In the electronic camera according to the third aspect, the setting information may include, at least, recognition information for being recognized from the external device.

In the electronic camera according to the third aspect, the light received by the image-capturing unit may be visible light.

A data communication apparatus according to a fourth aspect of the present invention comprises an information reception unit that receives network connection information required for establishing a connection via a network, transmitted from an external device, a storage unit that stores the received network connection information, and a transmission unit that transmits data to the external device via the network; the network connection information includes information for a plurality of connection methods by which connection is possible and setting information for connection by each connection method.

In the data communication apparatus according to the fourth aspect, the network connection information may include a priority order for the plurality of connection methods.

In the data communication apparatus according to the fourth aspect, the transmission and reception unit may establish connection to the network by connection method that is high in the priority order among the connection methods by which connection is possible.

An electronic camera according to the fourth aspect of the present invention comprises an image-capturing unit that creates image data, an information reception unit that receives network connection information required for establishing a connection via a network, transmitted from an external device, a storage unit that stores image data created by the image-capturing unit and the received network connection information, and a transmission and reception unit that receives data transmitted from the external device and transmits image data stored in the storage unit to the external device via the network; the network connection information includes information for a plurality of connection methods by which connection is possible and setting information for connection by each connection method.

In the electronic camera according to the fourth aspect, the network connection information may include a priority order for the plurality of connection methods.

In the electronic camera according to the fourth aspect, the transmission and reception unit may establish connection to the network by connection method that is high in the priority order among the connection methods by which connection is possible.

In a data communication system according to the first aspect of the present invention in which a first data communication apparatus and a second data communication apparatus are connected together via a network, the first data communication apparatus comprises a first storage unit that stores network connection information required for establishing a connection via the network with the second data communication apparatus, a light emission element that emits light, a light emission control unit that emits the network connection information from the light emission element as an optical signal by controlling an operation of the light emission element based upon the network connection information, and a reception unit that receives data transmitted from the second data communication apparatus via the network, and the second data communication apparatus comprises a light reception element that receives an optical signal sent from the light emission element of the first data communication apparatus, an information acquisition unit that acquires the network connection information, based upon the output of the light reception element, a second storage unit that stores the acquired network connection information, and a transmission unit means that transmits data to the first data communication apparatus via the network.

In a data communication system according to the second aspect of the present invention in which a first data communication apparatus and a second data communication apparatus are connected together via a network, the first data communication apparatus comprises a first storage unit that stores network connection information required for establishing a connection via the network with the second data communication apparatus, a transmission unit that transmits the network connection information, and a first transmission and reception unit that performs transmission and reception of data with the first data communication apparatus via the network, and the second data communication apparatus comprises an information reception unit that receives the network connection information transmitted from the first data communication apparatus, a second storage unit that stores the received network connection information, and a second transmission and reception unit that performs transmission and reception of data with the second data communication apparatus via the network; the network connection information includes information for a plurality of connection methods by which connection is possible and setting information for connection by each connection method.

Advantageous Effect of the Invention

According to the present invention, it becomes possible to transmit and receive data between data communication apparatuses with a simple operation, and without using any communication cable or memory card.

BRIEF DESCRIPTION OF THE DRAWINGS

FIG. 5 is a figure showing the details of network communication information used in this second embodiment of the present invention.

BEST MODE FOR CARRYING OUT THE INVENTION

Figure 1:
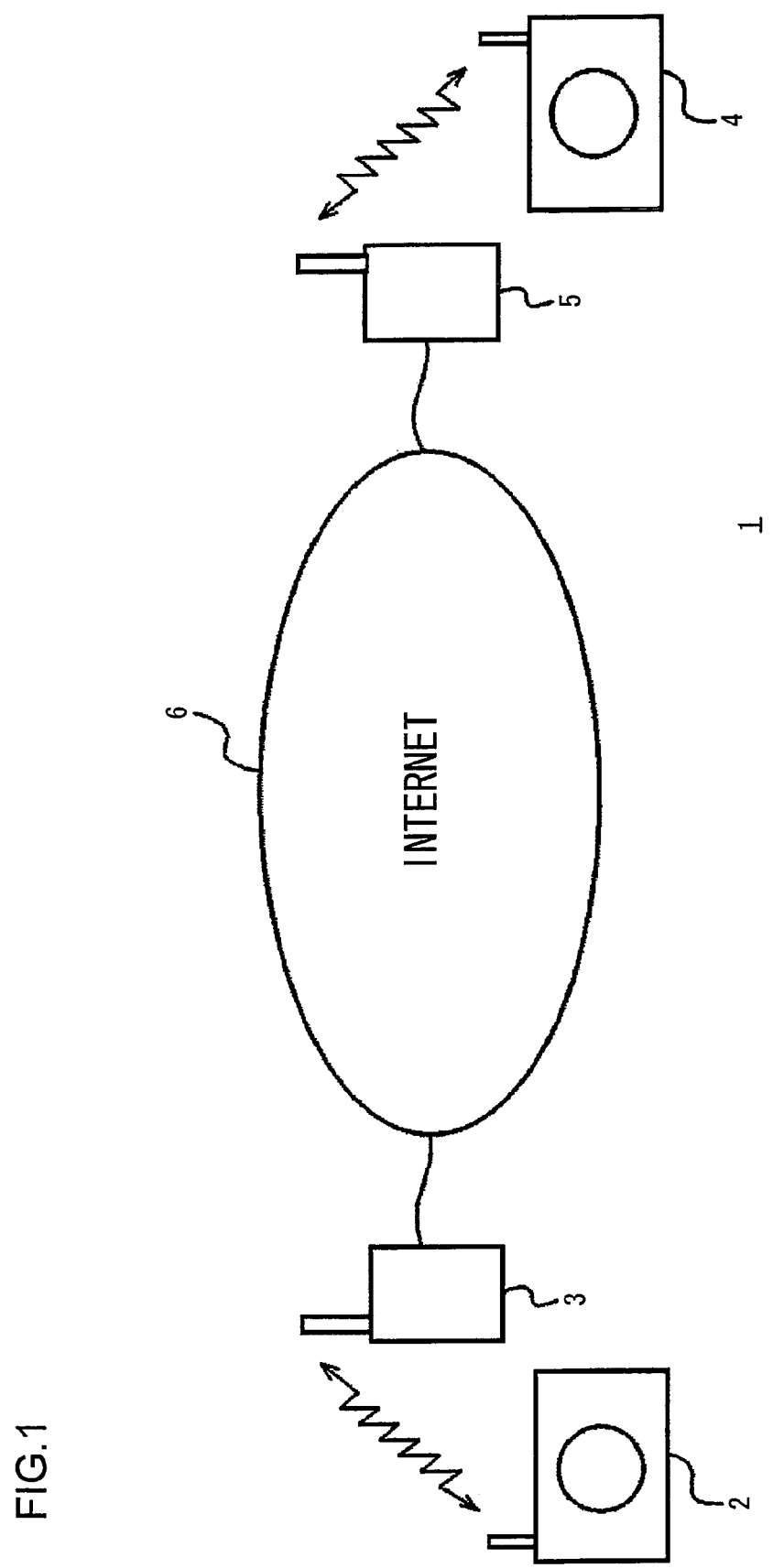
FIG. 1 is a block diagram showing the structure of a data communication system according to a first embodiment of the present invention.

In the following, a first embodiment of the present invention will be explained with reference to the appended drawings. FIG. 1 is a block diagram showing the structure of a data communication system according to the first embodiment of the present invention. In FIG. 1, a data communication system 1 includes a first electronic camera 2, a first access point 3 that is connected to the first electronic camera 2 via a wireless LAN, a second electronic camera 4, a second access point 5 that is connected to the second electronic camera 4 via a wireless LAN, and an internet circuit network 6 that is connected to the first access point 3 and to the second access point 5.

In the data communication system 1 of FIG. 1, the first electronic camera 2 and the second electronic camera 4 are connected to one another via the first access point 3, the second access point 5, and the internet circuit network 6. The first access point 3 and the second access point 5 are respectively for performing wireless communication with the first electronic camera 2 and the second electronic camera 4, accordingly they may be constituted as PCs or routers for wireless communication or the like.

Figure 2:
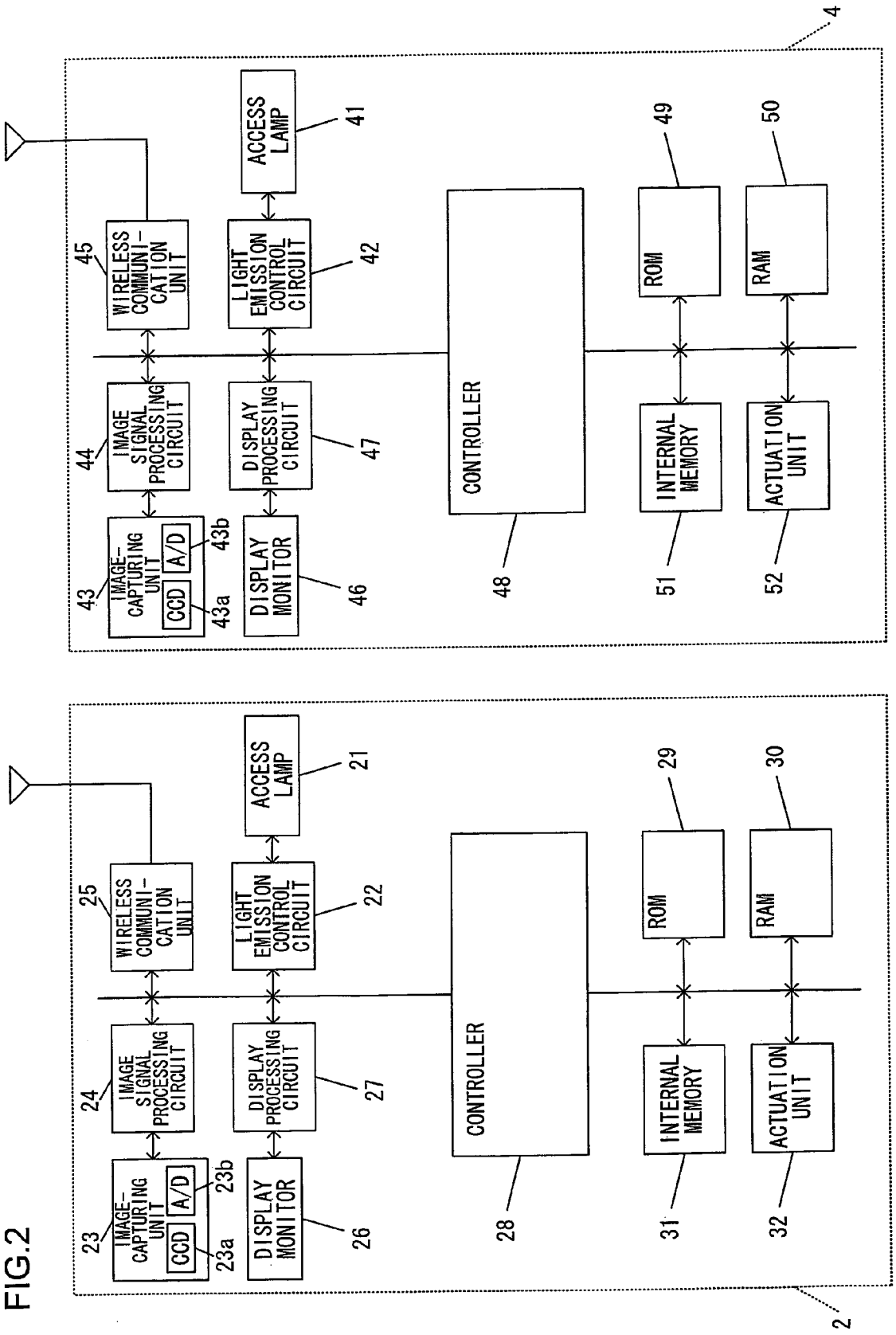
FIG. 2 is a block diagram showing the structure of a first electronic camera and a second electronic camera of FIG. 1.

FIG. 2 is a block diagram showing the structure of the first electronic camera and the second electronic camera of FIG. 1. In FIG. 2, the first electronic camera 2 includes an access lamp 21, a light emission control circuit 22 that controls the operation of the access lamp 21, an image-capturing unit 23 that captures an image and creates image data, an image signal processing circuit 24 that performs predetermined signal processing upon this image data, a wireless communication unit 25 that is connected to the first access point 3 via a wireless LAN, a display monitor 26 that displays an image, a display processing circuit 27 that drives the display monitor 26, a controller 28, a ROM 29, a RAM 30, an internal memory 31, and an actuation unit 32 upon which a mode change over button and an image data transmission button and so on are arranged.

This first electronic camera 2 is built so as to be able selectively to change over to four operational modes: a "photographic" mode in which it photographs a photographic subject and creates image data; a "replay" mode in which it replays image data and displays it upon the display monitor 26; an "image data communication" mode in which it transmits and receives image data to and from the second electronic camera 4; and a "connection information communication" mode in which it transmits and receives network connection information, such as an IP address, a sub-net mask, a WEP key, a user name and the like, to and from the second electronic camera 4.

On the other hand, in FIG. 2, the second electronic camera 4 also, similarly to the first electronic camera 2, includes an access lamp 41, a light emission control circuit 42, an image-capturing unit 43, an image signal processing circuit 44, a wireless communication unit 45 that is connected to the second access point 5 via a wireless LAN, a display monitor 46, a display processing circuit 47, a controller 48, a ROM 49, a RAM 50, an internal memory 51, and an actuation unit 52; and it also is built so as to be able selectively to change over to four operational modes—a "photographic" mode, a "replay" mode, an "image data communication" mode, and a "connection information communication" mode. The access lamp 41, the light emission control circuit 42, the image-capturing unit 43, the image signal processing circuit 44, the wireless communication unit 45, the display monitor 46, the display processing circuit 47, the controller 48, the ROM 49, the RAM 50, and the internal memory 51 that are provided to the second electronic camera 4 have the same structure as, respectively, the access lamp 21, the light emission control circuit 22, the image-capturing unit 23, the image signal processing circuit 24, the wireless communication unit 25, the display monitor 26, the display processing circuit 27, the controller 28, the ROM 29, the RAM 30, the internal memory 31 and the actuation unit 32 that are provided to the first electronic camera 2.

The access lamp 21 of the first electronic camera 2 functions as a lamp that indicates access to the internal memory 31, when the operational mode of the first electronic camera 2 is set to the "photographic" mode, the "replay" mode, or the "image data communication" mode, and, when the operational mode of the first electronic camera 2 is set to the "connection information communication" mode, then it functions as a light emission element when transmitting the network connection information as an optical signal, as will be described hereinafter. This access lamp 21 consists of a LED (Light Emitting Diode) that is capable of blinking at high speed. Since the light emission control circuit 22 of the first electronic camera 2 is for controlling the light emission timing of the access lamp 21, accordingly, if the operational mode of the first electronic camera 2 is set to the "photographic" mode, the "replay" mode, or the "image data communication" mode, then it causes the access lamp 21 to perform light emission when data that is recorded in the internal memory 31 is being read out, and when data is being recorded in the internal memory 31.

On the other hand, when the operational mode of the first electronic camera 2 is set to the "connection information communication" mode, then the light emission control circuit 22 functions so as to control the timing of turning on and turning off the access lamp 21, based upon the network connection information on the side of the first electronic camera 2, i.e. the IP address, the sub-net mask, the WEP key, the user name and the like. In concrete terms, a data value of "1" is made to correspond to emission of light by the access lamp 21, while a data value of "0" is made to correspond to the access lamp 21 being turned off. And, by controlling the turned on time period and the turned off time period of the access lamp 21 in synchronism with a predetermined transmission cycle, the network connection information is caused to be outputted from the access lamp 21 as an optical signal. Accordingly, the network connection information of the first electronic camera 2 is transmitted to the second electronic camera 4 by using the visible light emitted from the access lamp 21 as a communication medium.

The access lamp 41 and the light emission control circuit 42 of the second electronic camera 4 have the same structure, respectively, as the access lamp 21 and the light emission control circuit 22 of the first electronic camera 2. Due to this, when the operational mode of the second electronic camera 4 is set to the "connection information communication" mode, an optical signal that has been modulated based upon the network connection information upon the side of the second electronic camera 4 is transmitted from the access lamp 41 and the light emission control circuit 42 of the second electronic camera 4 to the first electronic camera 2.

The image-capturing unit 23 of the first electronic camera 2 includes a CCD image sensor 23a and an A/D converter 23b. This CCD image sensor 23a includes: a light reception unit (not shown in the figures) in which a plurality of light reception picture elements are arranged in the form of a matrix, and that accumulates electric charges generated by photoelectric conversion on these light reception picture elements; a transfer unit (not shown in the drawings) that transfers these electric charges accumulated upon the light reception picture elements of the light reception unit; and an output unit that converts the electric charges transferred by the transfer unit to electrical signals, that it outputs; and this CCD image sensor 23a thereby outputs an image signal corresponding to the image of the photographic subject that was imaged upon the light reception unit. On the other hand, in synchronism with the output timing of the image signal from the CCD image sensor 23a, the A/D converter 23b converts the image signal outputted from the CCD image sensor 23a into digital form in units of one picture element at a time, and thereby generates image data.

The image-capturing unit 23 performs a function as a light reception element that outputs an image signal based upon an image of the photographic subject when the operational mode of the first electronic camera 2 is set to the "photographic" mode, and, on the other hand, performs a function as a light reception element that receives an optical signal outputted from the access lamp 41 of the second electronic camera 4 when the operational mode of the first electronic camera 2 is set to the "connection information communication" mode. Accordingly, when the operational mode of the first electronic camera 2 is set to the "connection information communication" mode, data corresponding to this optical signal is outputted from the image-capturing unit 23. In the following, in this specification, the data that is outputted from the image-capturing unit 23 due to receipt of an optical signal will be termed "optical data", in order to distinguish it from image data that is obtained by capturing an image of a photographic subject.

On the other hand, the image-capturing unit 43 of the second electronic camera 4 has the same structure as the image-capturing unit 23 of the first electronic camera 2. Due to this, just like the image-capturing unit 23 of the first electronic camera 2, when the operational mode of the second electronic camera 4 is set to the "photographic" mode, then image data corresponding to an image of the photographic subject is outputted from the image-capturing unit 43 of the second electronic camera 4; while, when the operational mode of the second electronic camera 4 is set to the "connection information communication" mode, optical data corresponding to the optical signal that has been transmitted from the access lamp 21 of the first electronic camera 2 is outputted.

When the operational mode of the first electronic camera 2 is set to the "photographic" mode, the image signal processing circuit 24 of the first electronic camera 2 performs digital signal processing such as white balance processing, gamma compensation processing and the like upon the image data outputted from the A/D converter 23b, and moreover performs data compression processing such as changing the image size and so on. On the other hand, when the operational mode of the first electronic camera 2 is set to the "connection information communication" mode, this image signal processing circuit 24 samples the optical data that is outputted from the A/D converter 23b in synchronism with the transmission cycle of the optical signal from the access lamp 41 of the second electronic camera 4, and replays the network connection information of the second electronic camera 4 from the optical data. The image signal processing circuit 44 of the second electronic camera 4 has the same structure as the image signal processing circuit 24 of the first electronic camera 2. Due to this, when the operational mode of the second electronic camera 4 is set to the "connection information communication" mode, optical data that is outputted from the image-capturing unit 43 of the second electronic camera 4 is sampled by the image signal processing circuit 44 of the second electronic camera 4, and thereby the network connection information of the first electronic camera 2 is replayed.

After the wireless communication unit 25 of the first electronic camera 2 has performed FM modulation processing or the like upon the image data outputted from the image-capturing unit 23 and image data stored in the internal memory 31 and has superposed them upon a predetermined carrier wave, the wireless communication unit 25 transmits the image data as radio waves to the first access point 3. Moreover, via the internet circuit network 6 and the first access point 3, the wireless communication unit 25 receives radio waves that are wirelessly transmitted from the second electronic camera 4, performs FM demodulation processing or the like upon these received radio waves, and thereby replays image data transmitted from the second electronic camera 4. Similarly, the wireless communication unit 45 of the second electronic camera 4, along with wirelessly transmitting image data to the second access point 5, also receives radio waves that are wirelessly transmitted from the first electronic camera 2 via the internet circuit network 6 and the second access point 5, and replays the image data.

The controller 28 of the first electronic camera 2 reads out and executes a control program that is recorded in the ROM 29 when the power supply switch of the first electronic camera 2 is turned ON, and then starts the first electronic camera 2. Furthermore, the controller 28 controls the overall operation of the first electronic camera 2 according to this control program. The RAM 30 of the first electronic camera 2, along with temporarily storing image data outputted from the image-capturing unit 23, also functions as a buffer memory when performing various types of image processing and also image compression and expansion processing. The internal memory 31 of the first electronic camera 2 is, for example, a non-volatile memory such as a flash memory or the like, and stores image data outputted from the image-capturing unit 23, or image data upon which image processing has been performed by the image signal processing circuit 24. Moreover, the controller 48, the ROM 49, the RAM 50, and the internal memory 51 of the second electronic camera 4 function in a similar manner to, respectively, the controller 28, the ROM 29, the RAM 30, and the internal memory 31 of the first electronic camera 2.

After a network has been created between the first electronic camera 2 and the second electronic camera 4, the data communication system 1 according to this embodiment, having a structure like the one above, transmits and receives image data mutually between the first electronic camera 2 and the second electronic camera 4 via the wireless LANs, by doing as will now be described.

Figure 3:
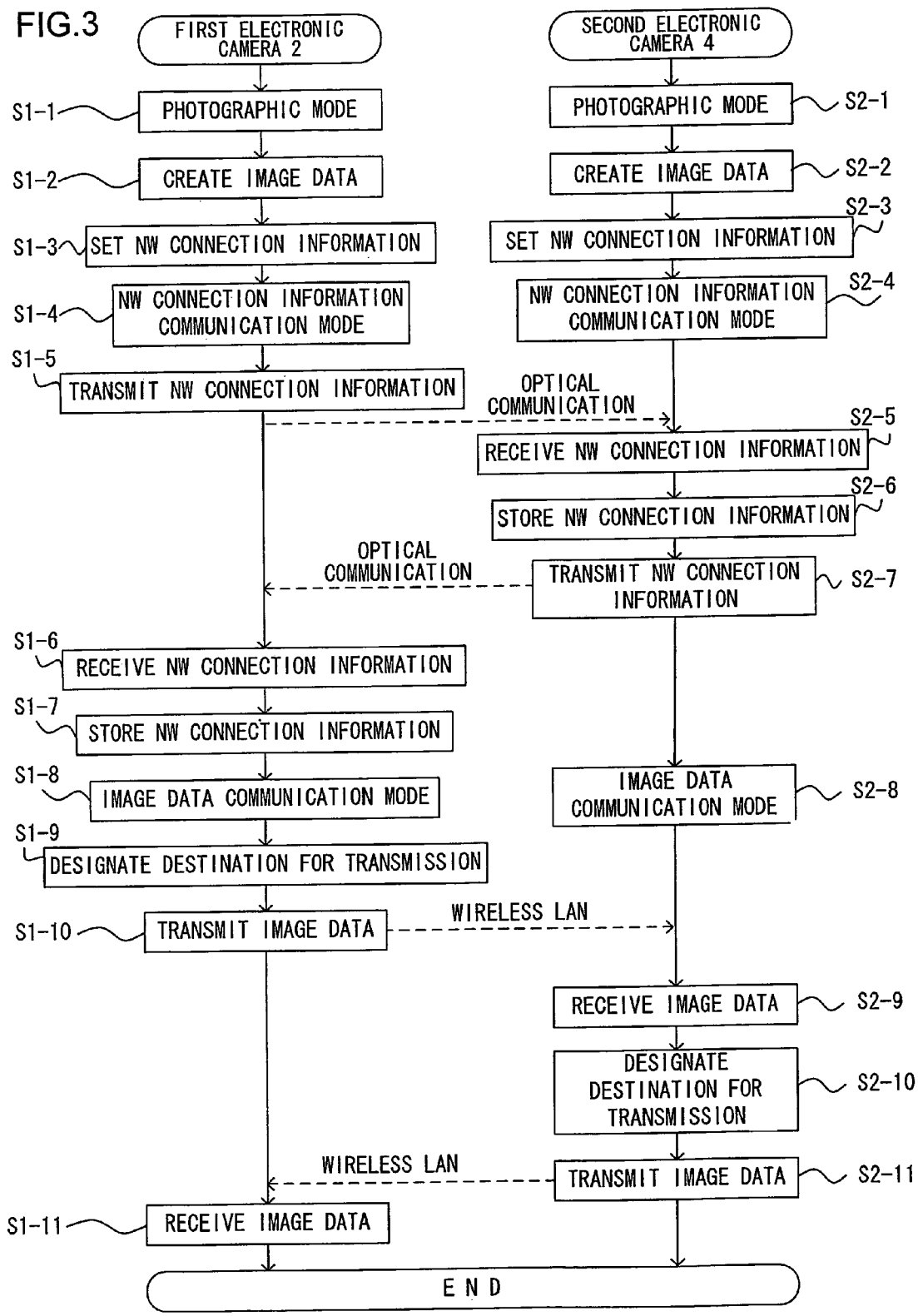
FIG. 3 is a flow chart showing a processing sequence that is executed by this data communication system for communication of image data.

FIG. 3 is a flow chart showing the processing sequence that is executed by this data communication system 1 for communication of image data. For transmission and reception of image data between the first electronic camera 2 and the second electronic camera 4, in FIG. 3, first the operational mode of the first electronic camera 2 is set to the "photographic" mode (a step S1-1) Next, a photographic subject is photographed with the first electronic camera 2, and image data is created by the image-capturing unit 23 and the image signal processing circuit 24 of the first electronic camera 2 (a step S1-2). The image data that has been created in this manner is recorded in the internal memory 31 of the first electronic camera 2. In a similar manner, the operational mode of the second electronic camera 4 is also set to the "photographic" mode, and, along with a photographic subject being photographed and image data being created, this image data that has been created is recorded in the internal memory 51 of the second electronic camera 4 (steps S2-1 and S2-2) It would be acceptable for this image data that is created by the first electronic camera 2 and the second electronic camera 4 to be image data for still images; and it would also be acceptable for it to be image data for moving images.

In this manner, when the respective image data are recorded in the internal memory 31 of the first electronic camera 2 and in the internal memory 51 of the second electronic camera 4, along with the network connection information of the first electronic camera 2 being set into the first electronic camera 2, also the network connection information of the second electronic camera 4 is set into the second electronic camera 4. When setting the network connection information of the first electronic camera 2 into the first electronic camera 2, first, the network connection information of the first electronic camera 2 is inputted by the user into a PC (not shown in the drawings), and this network connection information is recorded upon a hard disk within the PC. Next, the first electronic camera 2 is connected to the PC via a communication cable, and the network connection information of the first electronic camera 2 that has been recorded upon the hard disk within the PC is transmitted to the first electronic camera 2. In this manner, the network connection information that has been transmitted is recorded in the internal memory 31 of the first electronic camera 2 as its own network connection information (a step S1-3).

And, when setting the network connection information of the second electronic camera 4 into the second electronic camera 4 as well, in a similar manner to when setting the network connection information of the first electronic camera 2 into the first electronic camera 2, after the network connection information of the second electronic camera 4 has been inputted by the user into a PC, this network connection information that has been inputted into the PC is transmitted via a communication cable to the second electronic camera 4, and is recorded in the internal memory 51 of the second electronic camera 4. When, in this manner, their own network connection information is set into both the first electronic camera 2 and the second electronic camera 4, then the respective network connection information may be mutually transmitted and received between the first electronic camera 2 and the second electronic camera 4.

For transmission of network connection information between the first electronic camera 2 and the second electronic camera 4, first, the operational modes of both the first electronic camera 2 and the second electronic camera 4 are set to the "connection information communication" mode (steps S1-4 and S2-4).

When transmitting the network connection information of the first electronic camera 2 from the first electronic camera 2 to the second electronic camera 4, first, the first electronic camera 2 and the second electronic camera 4 are arranged so that the access lamp 21 of the first electronic camera 2 and the image-capturing unit 43 of the second electronic camera 4 are facing one another. Next, the actuation unit 32 of the first electronic camera 2 is actuated by the user, and a command signal is inputted into the first electronic camera 2 to the effect that the network connection information of the first electronic camera 2 should be transmitted to the second electronic camera 4. As a result, the network connection information of the first electronic camera 2 that is recorded in the internal memory 31 of the first electronic camera 2 is read out, and is outputted to the light emission control circuit 22 of the first electronic camera 2. Next, based upon the network connection information of the first electronic camera 2, the light emission timing of the access lamp 21 is controlled by the light emission control circuit 22, and thereby an optical signal is transmitted from the access lamp 21 towards the second electronic camera 4 (a step S1-5).

This optical signal that has been transmitted from the access lamp 21 is received by the image-capturing unit 43 of the second electronic camera 4, and, next, optical data according to this optical signal that has been received is outputted from the image-capturing unit 43 of the second electronic camera 4 (a step S2-5). This optical data that has been outputted from the image-capturing unit 43 is outputted to the image signal processing circuit 44, and thereafter this optical data is sampled by the image signal processing circuit 44, and the network connection information of the first electronic camera 2 is replayed. And the network connection information of the first electronic camera 2 that has been replayed in this manner is recorded in the internal memory 51 of the second electronic camera 4 (a step S2-6).

On the other hand, when transmitting the network connection information of the second electronic camera 4 from the second electronic camera 4 to the first electronic camera 2, the first electronic camera 2 and the second electronic camera 4 are arranged so that the access lamp 41 of the second electronic camera 4 and the image-capturing unit 23 of the first electronic camera 2 are facing one another. Next, in a similar manner to when the network connection information was transmitted from the first electronic camera 2 to the second electronic camera 4, an optical signal corresponding to the network connection information of the second electronic camera 4 is transmitted from the access lamp 41 of the second electronic camera 4 towards the first electronic camera 2 (a step S2-7) Thereafter, this optical signal is received by the image-capturing unit 23 of the first electronic camera 2, and, along with the network connection information of the second electronic camera 4 being replayed by the image signal processing circuit 24 of the first electronic camera 2, also this network connection information of the second electronic camera 4 that has been replayed is recorded in the internal memory 31 of the first electronic camera 2 (steps S1-6 and S1-7).

By doing the above, along with the network connection information of the second electronic camera 4 being recorded in the internal memory 31 of the first electronic camera 2, also the network connection information of the first electronic camera 2 is recorded in the internal memory 51 of the second electronic camera 4. And a state is established in which it is possible to transmit image data via the wireless LANs mutually between the first electronic camera 2 and the second electronic camera 4. In this type of state, for transmitting and receiving image data via the wireless LANs, first the operational modes of the first electronic camera 2 and the second electronic camera 4 are set to the "image data communication" mode, and then the first electronic camera 2 is connected via wireless LAN to the first access point 3. Furthermore, the second electronic camera 4 and the second access point 5 are also connected together via wireless LAN (steps S1-8 and S2-8).

Next, the actuation unit 32 of the first electronic camera 2 is actuated by the user, and a command signal is inputted to the first electronic camera 2 to the effect that image data that is recorded in the internal memory 31 should be transmitted. Along with this, a list of the image data that can be transmitted and a list of external devices that are destinations for transmission are displayed upon the display monitor 26. At this time point, since the network connection information of the second electronic camera 4 is recorded in the internal memory 31, accordingly the second electronic camera 4 is displayed as a destination for transmission of image data upon the display monitor 26. Next, the actuation unit 32 of the first electronic camera 2 is actuated by the user, and the second electronic camera 4 is confirmed as the destination for transmission of image data. Moreover, when the transmit button for image data is actuated, along with the image data that is recorded in the internal memory 31, the network connection information for the second electronic camera 4 is also outputted from the wireless communication unit 25 of the first electronic camera 2 via the first access point 3 to the internet circuit network 6 (a step 1-9).

In this manner, when the image data and the network connection information of the second electronic camera 4 are outputted from the first electronic camera 2 to the internet circuit network 6, a data communication path from the first access point 3 to the second access point 5 is set up by the internet circuit network 6. Moreover, a data communication path is set up by the second access point 5 from the second access point 5 to the second electronic camera 4. Due to this, a network connection is set up between the first electronic camera 2 and the second electronic camera 4. Thereafter, the image data is transmitted to the second electronic camera 4 via the first access point 3, the internet circuit network 6, and the second access point 5, and is received by the wireless communication unit 45 of the second electronic camera 4 (steps S1-10 and S2-9).

On the other hand, when image data is to be transmitted from the second electronic camera 4 to the first electronic camera 2 as well, in a similar manner to when transmitting image data from the first electronic camera 2 to the second electronic camera 4, the network connection information of the first electronic camera 2 is outputted from the second electronic camera 4 to the internet circuit network 6 along with the image data. And the image data is transmitted to the first electronic camera 2 via the second access point 5, the internet circuit network 6, and the first access point 3 (steps S2-10, S2-11, and S1-11).

As described above, according to this embodiment, it is possible to transmit the network connection information of the destination for transmission of image data from the electronic camera that is the destination for transmission of image data to the electronic camera that is the transmission side of the image data, by taking advantage of optical communication. Accordingly, it becomes possible to set the network connection information of the electronic camera that is the destination for transmission of image data into the electronic camera on the transmission side of image data by a simple actuation, and without any requirement for a communication cable or a memory card.

Furthermore since, when converting the network connection information to an optical signal and transmitting it, the network connection information is transmitted only in the direction in which the light is emitted, accordingly it is possible to transmit the network connection information to the intended opposite party in a simple manner. Therefore the security level is high, as compared to the case of transmitting the network connection information by using radio waves as a communication medium. Furthermore, when performing processing to encrypt the network connection information as well, there is no requirement to perform high grade encrypting processing. Due to this, along with it becoming possible to enhance the speed of communication, also it becomes possible to reduce the size of the calculation circuitry for encrypting.

Moreover since, according to this embodiment, it is arranged to transmit and receive the network connection information using visible light as the communication medium, accordingly it is possible for the user to confirm by visual inspection that the network connection information is being transmitted and received, so that it becomes possible to enhance the level of convenience.

Furthermore since, according to this embodiment, it is arranged to output the optical signal using a LED that can be blinked at high speed, therefore it is possible to enhance the communication rate of the optical signal. Accordingly, it becomes possible to transmit the network connection information rapidly from the electronic camera that is the destination for transmission of the image data to the electronic camera on the transmission side for the image data.

Furthermore since, according to this embodiment, it is arranged to transmit the optical signal from the access lamp of the electronic camera that is the destination for transmission of the image data, and to receive the optical signal with the image-capturing unit of the electronic camera that is the transmission side for the image data, therefore it is possible to transmit and receive the optical signal by taking advantage of the already existing hardware structure of the electronic cameras. Accordingly, it ceases to be necessary to add any new hardware structure to the electronic cameras, so that it becomes possible to suppress increase in the cost of the electronic cameras and of the data communications system as a whole.

It should be understood that, in the data communication system 1 according to this embodiment, the access lamp 21 of the first electronic camera 2 and the access lamp 41 of the second electronic camera 4 are used as the light emission elements for transmitting optical signals. However, instead of the access lamps, it would also be acceptable to use power supply lamps, backlights of display monitors, auxiliary lamps used for auto focus processing, self-timer lamps that are used when setting photographic timing, or the like, as the light emission elements for transmitting optical signals.

Furthermore, in the data communication system 1 according to this embodiment, light emission elements in which LEDs are used for the light sources are used as the light emission elements for transmitting the optical signals. However, it would also be acceptable to use light emission elements that use some devices other than LEDs for the light sources as the light emission elements for transmitting the optical signals, provided that they are light emission elements that can be blinked at high speed.

Furthermore, in the data communication system 1 according to this embodiment, the CCD image sensor 21a of the first electronic camera 2 and the CCD image sensor 41a of the second electronic camera 4 are used as the light reception elements for receiving the optical signals. However, it would also be acceptable to provide, to the electronic camera, light reception elements that are separate from the CCD image sensors for photographing photographic subjects, and to arrange to receive the optical signals with these light reception elements.

Furthermore, in the data communication system 1 according to this embodiment, it is arranged for the electronic camera on the transmission side for the image data to keep the network connection information for the electronic camera that is the destination for transmission of the image data, by connecting each of the first electronic camera 2 and the second electronic camera 4 to a PC, setting the network connection information for each of the first electronic camera 2 and the second electronic camera 4 into that camera, and thereafter mutually transmitting and receiving this network connection information by using optical communication. However, it would also be acceptable to connect only one of the first electronic camera 2 and the second electronic camera 4 to a PC, to set the network connection information for both the first electronic camera 2 and the second electronic camera 4 into that electronic camera that is connected to the PC, and thereafter for the electronic camera that is the transmission side for the image data to store the network connection information for the electronic camera that is the destination for transmission of the image data, by transmission of the network connection information that has thus been inputted to the other one of the first electronic camera 2 and the second electronic camera 4, using optical communication.

Furthermore, in the data communication system 1 according to this embodiment, it was arranged for the user to set the network connection information into the first electronic camera 2 and the second electronic camera 4 by using a PC, and then to establish a network connection between the first electronic camera 2 and the second electronic camera 4 using this network connection information that has been set. However, it would also be acceptable to provide a structure in which, instead of network connection information that the user has set, the network connection is established using, as the network connection information, IP addresses and the like that are set as default values during the manufacturing stage of the electronic cameras.

Furthermore, in the data communication system 1 according to this embodiment, it was arranged to connect together the first electronic camera 2 and the second electronic camera 4 to the internet circuit network 6 via wireless LANs. However, it would also be acceptable to arrange to connect at least one of the first electronic camera 2 and the second electronic camera 4 via a cable, and not via a wireless LAN.

Furthermore, in the data communication system 1 according to this embodiment, it was arranged to transmit and receive image data between the first electronic camera 2 and the second electronic camera 4 via the first access point 3, the second access point 5, and the internet circuit network 6. However, it would also be acceptable to set up a network by wireless or cable connection with the first electronic camera 2 and the second electronic camera 4 only, i.e. not via the first access point 3, the second access point 5, and the internet circuit network 6, and thereby to transmit and receive the image data between the first electronic camera 2 and the second electronic camera 4 directly.

Furthermore, in the data communication system 1 according to this embodiment, it was arranged to transmit and receive only image data between the first electronic camera 2 and the second electronic camera 4. However, in addition to image data, it would also be acceptable to arrange to transmit and receive audio data, or, after having converted such audio data to character data, to arrange to transmit and receive this character data along with the image data.

Furthermore, in this embodiment, a data communication system was explained in which two electronic cameras—the first electronic camera 2 and the second electronic camera 4—are connected together via wireless LANs. However, it would also be possible to apply the present invention to a data communication system in which three or more electronic cameras are connected together.

Moreover, in this embodiment, a data communication system has been explained in which the first electronic camera 2 and the second electronic camera 4 are connected together via wireless LANs. However, the present invention can also be applied, for example, to a data communication system in which an electronic camera and a printer are connected together, or to a data communication system in which PCs are connected together, or, more broadly, to a data communication system in which devices that are capable of transmitting and receiving data are connected together.

Next, a second embodiment of the present invention will be explained. Although, in the first embodiment, it was arranged to connect together the two electronic cameras via wireless LANs, some method other than a wireless LAN may be employed as the connection method; and also, when using electronic cameras that are not endowed with any wireless LAN function, it is desirable to arrange for it to be possible to connect them together with a connection method other than a wireless LAN. Thus, in the second embodiment, it is arranged for it to be possible to establish a network connection by selecting a single connection method from a plurality of connection methods, according to the functionalities of the electronic cameras, the situation when connecting, and so on.

Figure 4:
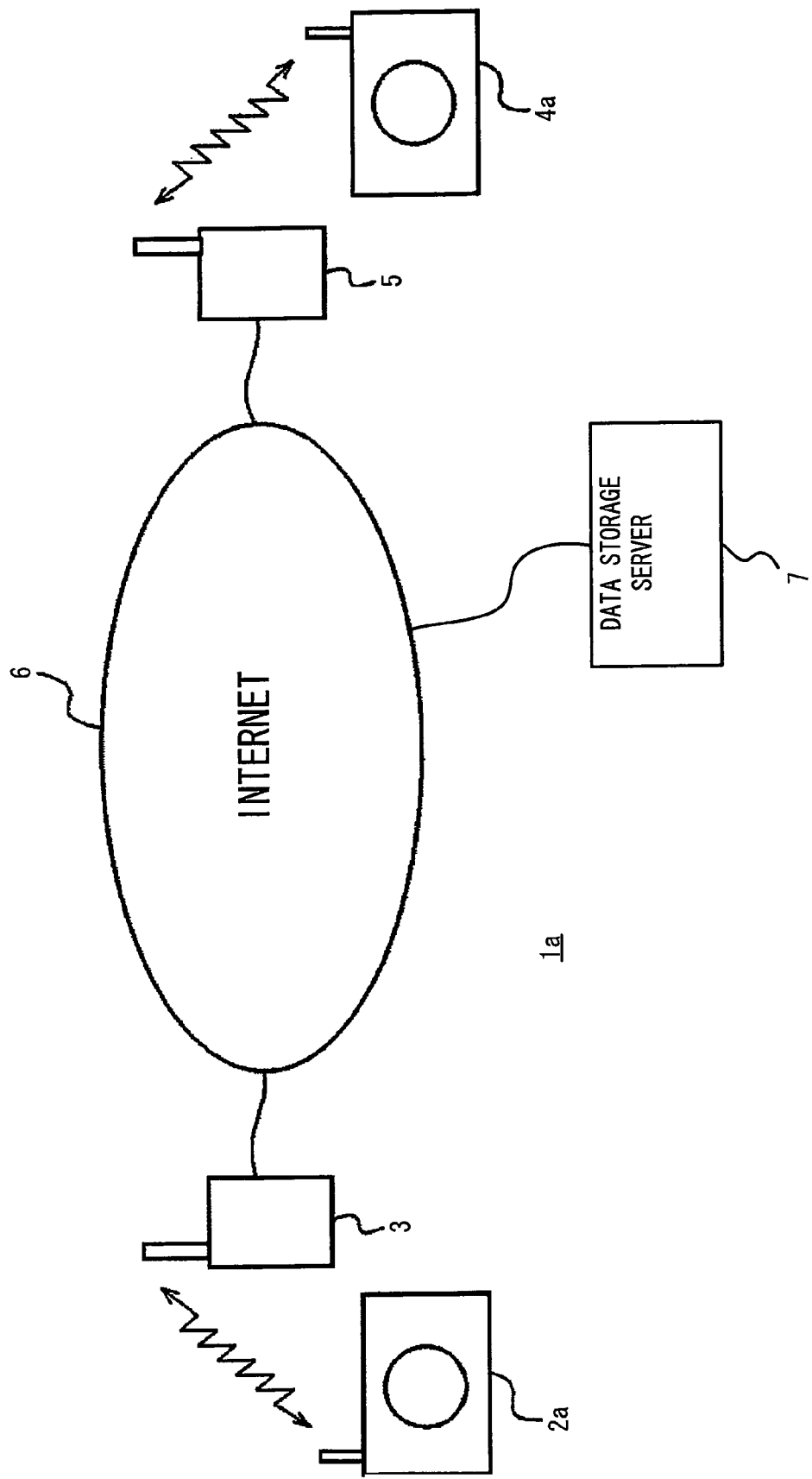
FIG. 4 is a block diagram showing the structure of a data communication system according to a second embodiment of the present invention.

FIG. 4 is a block diagram showing the structure of a data communication system according to a second embodiment of the present invention. In FIG. 1, the data communication system 1a includes a first electronic camera 2a, a second electronic camera 4a, a first access point 3, a second access point 5, an internet circuit network 6, and a data storage server 7. The first electronic camera 2a and the second electronic camera 4a have similar structures to those of the first electronic camera 2 and the second electronic camera 4 of the first embodiment, but the details of the network connection information, and the operation when establishing a network connection based upon network connection information that is received, are different from those in the first embodiment. The first access point 3, the second access point 5, and the internet circuit network 6 are the same as those shown in FIG. 1.

The data storage server 7 is connected to the internet circuit network 6, and is capable of storing data that has arrived by transmission via the network; and, moreover, according to a request from some other device that is connected to the internet circuit network 6, it is capable of transmitting stored data to that device. In other words, in the state in which the first electronic camera 2a or the second electronic camera 4a has been connected to the network, by transmitting image data from the first electronic camera 2a or the second electronic camera 4a to the data storage server 7, it is possible to store that image data upon the data storage server 7. Furthermore, in the state in which the first electronic camera 2a or the second electronic camera 4a has been connected to the network, by sending a transmission request for image data from the first electronic camera 2a or the second electronic camera 4a to the data storage server 7, it is possible to download that image data that is stored upon the data storage server 7 to the first electronic camera 2a or the second electronic camera 4a.

FIG. 5 is a figure showing the details of network communication information that is exchanged between the two electronic cameras in this embodiment. Since, in the first embodiment, it was supposed that the connection method for connecting to the other electronic camera was by wireless LAN, accordingly, for example, the network connection information exchanged from the first electronic camera 2 to the second electronic camera 4 was only information for the second electronic camera 4 to connect to the first electronic camera 2 via the network. By contrast, in this embodiment, connection information is exchanged for a plurality of connection methods, including methods of connection other than via wireless LAN. And priority order information is appended to this plurality of connection methods.

In FIG. 5, the connection method of priority order #1 is FTP (File Transfer Protocol) connection, and, as the connection information, the IP address user name (and perhaps a password) of the electronic camera on the side that sends this connection information is used. This connection method is the same as the connection method in the first embodiment. And the connection method of priority order #2 is utilization of the data storage service, and the connection information is the URL (Uniform Resource Locator) of this data storage service and the user name (and perhaps a password). Moreover, the connection method of priority order #3 is connection via USB (Universal Serial Bus), and the connection information is the USB version. This connection method is when sending and receiving data by connecting together the two electronic cameras with a USB cable, and is used if one or the other of the electronic cameras cannot be connected to a network. If the positions of the two electronic cameras are separated from one another, then connection with this connection method is impossible. And the connection method of priority order #4 is visible light communication. As explained for the first embodiment, such visible light communication is a communication method in which modulated optical signals are sent by blinking the access lamp 21 (or 42) of FIG. 2. No connection information in particular is required in connection with this visible light communication. The reason for this is that the two electronic cameras are endowed with the function of transmitting and receiving data by visible light communication, and the information of FIG. 5 is also sent and received by visible light communication. Similarly to the case of connection via USB, if the positions of the two electronic cameras are separated from one another, then connection with this connection method is impossible.

Next, the operation when mutually transmitting and receiving image data between the first electronic camera 2a and the second electronic camera 4a will be explained. This communication processing sequence will be explained with reference to FIG. 3 for the first embodiment, since many portions thereof are common with the flow chart of FIG. 3. It should be understood that, in the following explanation, it is supposed that the first electronic camera 2 and the second electronic camera 4 of FIG. 3 are respectively to be replaced by the first electronic camera 2a and the second electronic camera 4a. In this sequence for sending and receiving the network connection information between these two electronic cameras, the steps S1-1-S1-7 and the steps S2-1-S2-7 of FIG. 3 are the same. It is supposed that, as the network connection information, the detailed data shown in FIG. 5 and described above is to be sent to each of the electronic cameras.

Next, when the operational modes of the first electronic camera 2a and the second electronic camera 4a are set to the "image data communication" mode, in a manner similar to the first embodiment, the first electronic camera 2a is connected to the first access point 3 via a wireless LAN. Moreover, the second electronic camera 4a and the second access point 5 are connected together via a wireless LAN (steps S1-8 and S2-8) Each of the electronic cameras is endowed with the function of being capable of network connection via a wireless LAN, and moreover the connection method of priority order #1 for network connection information sent to the other electronic camera is FTP connection. Accordingly, in order to correspond to data communication processing by FTP connection from the other electronic camera, here, network connection is performed via the wireless LANs. By doing this, in both of the electronic cameras, a state is established in which preparations have been completed for receiving image data by FTP connection via the internet circuit network 6.

Next, in a step S1-9, when the image data and its destination for transmission (the second electronic camera 4a) are designated by the first electronic camera 2a, the network connection information for the second electronic camera 4a is read out from the internal memory 31. In other words, the network connection information of FIG. 5 is read out. In this embodiment, the first electronic camera 2a and the second electronic camera 4a are capable of connection by all of the connection methods of priority orders #1 through #4 shown in FIG. 5. And the first electronic camera 2a first attempts to connect by FTP connection, that has priority order #1. And, if network connection with the second electronic camera 4a can be established, in a similar manner to the case of the first embodiment, the image data is transmitted from the first electronic camera 2a to the second electronic camera 4a via the internet circuit network 6 (a step S1-10).

However, if an FTP connection cannot be established, then an attempt is made at connection by the connection method of priority order #2. In such a state when FTP connection cannot be established, it is considered that perhaps the power supply of the other electronic camera (i.e. of the second electronic camera 4a) may be in the OFF state, or perhaps a state holds in which the other electronic camera or this electronic camera (i.e. the first electronic camera 2a) cannot be connected to the network (i.e. if it is not within the range over which wireless LAN connection is possible, or the like). The connection method of priority order #2 is utilization of the data storage service in which, via wireless LAN connection, the first electronic camera 2a transmits the image data to the data storage server 7 that is connected to the internet circuit network 6. If the image data is transmitted normally, then this transmitted image data is stored upon the data storage server 7. Thereafter, by wireless LAN connection, the second electronic camera 4a issues a transmission request to the data storage server 7 for the image data, and the image data that is stored should be downloaded. In order for it to be known by the second electronic camera 4a that image data is stored upon the data storage server 7, various methods may be considered. For example there is the method, when image data has been stored upon the data storage server 7, for it to transmit electronic mail to the second electronic camera 4a, so as to inform it that image data has been stored. Moreover a method would also be acceptable in which, when the second electronic camera 4a is in the state of being connected to the network, it issues a transmission request to the data storage server 7 periodically.

If it is not possible to establish a connection to the data storage server 7, then an attempt is made to connect by the connection method of priority order #3. If it is not possible to establish a connection to the data storage server 7, then it is considered that perhaps a fault may have occurred with the data storage server 7, or perhaps a state holds in which the first electronic camera 2a cannot be connected to the network (i.e. if it is not within the range over which wireless LAN connection is possible, or the like). The connection method of priority order #3 is USB connection, and, when connection by this connection method is attempted, the two electronic cameras are connected together with a USB cable. If it is possible to establish this connection via cable, then the image data is transmitted to the other electronic camera.

If it is not possible to establish a connection by USB connection, then an attempt is made at connection with the connection method of priority order #4. If it is not possible to establish a connection via USB, then it is considered that perhaps no cable is available so that it is not possible physically to connect the two cameras together, or the like. The connection method of priority order #4 is visible light communication, and, since this is the connection method that is used for sending and receiving the network connection information, connection must be possible when the two electronic cameras are close together. If it is possible to establish a connection, then the image data is transmitted to the other camera. With the connection methods of priority orders #3 and #4, it is only possible to connect together two electronic cameras that are positioned close to one another.

Although, in the above explanation, the case was explained of transmitting the image data from the first electronic camera 2a to the second electronic camera 4a, in the case of sending image data from the second electronic camera 4a to the first electronic camera 2a as well, it is possible to perform transmission of the image data in a similar manner by interchanging the operation of the two electronic cameras.

Since, as described above, according to this second embodiment, the connection information may be transferred to the other device by a plurality of connection methods, therefore, even if it is not possible to establish a connection by some connection method, since it is possible to attempt to transmit the image data by connection by some other connection method, accordingly the possibility becomes high that it may be possible reliably to transmit the image data to the other device.

The contents of the disclosure of the following patent application, upon which priority is claimed, are hereby incorporated by reference:

Japanese Patent Application 2005-265127 (filed on Sep. 13, 2005).

The invention claimed is:

1. A data communication system in which a first electronic camera and a second electronic camera are connected together via a network, wherein
the first electronic camera comprises:
a first image-capturing unit that captures an image of a photographic subject to create image data and receives light emitted from the second electronic camera;
a first storage unit that stores image data created by the first image-capturing unit and network connection information corresponding to the first electronic camera;
a first light emission element that emits light;
a first light emission control unit that converts the network connection information stored in the first storage unit into an optical signal and emits the optical signal from the first light emission element to the second electronic camera by controlling an operation of the first light emission element based upon the network connection information stored in the first storage unit;
a first information acquisition unit that acquires network connection information corresponding to the second electronic camera based upon light received by the first image-capturing unit;
a first reception unit that receives image data transmitted from the second electronic camera via the network; and
a first transmission unit that transmits image data via the network, based upon the network connection information acquired by the first information acquisition unit, and
the second electronic camera comprises:
a second image-capturing unit that captures an image of a photographic subject to create image data and receives light emitted from the first electronic camera;
a second storage unit that stores image data created by the second image-capturing unit and the network connection information corresponding to the second electronic camera;
a second light emission element that emits light;
a second light emission control unit that converts the network connection information stored in the second storage unit into an optical signal and emits the optical signal from the second light emission element to the first electronic camera by controlling an operation of the second light emission element based upon the network connection information stored in the second storage unit;
a second information acquisition unit that acquires the network connection information corresponding to the first electronic camera based upon light received by the second image-capturing unit;
a second reception unit that receives image data transmitted from the first electronic camera via the network; and
a second transmission unit that transmits image data via the network, based upon the network connection information acquired by the second information acquisition unit, and wherein:
the network connection information corresponding to the first electronic camera and the network connection information corresponding to the second electronic camera each include at least connection information for transmitting and receiving the image data mutually between the first electronic camera and the second electronic camera, and connection information for storing the image data into a server;
if the first electronic camera and/or the second electronic camera transmit the image data based upon the connection information for transmitting and receiving the image data mutually between the first electronic camera and the second electronic camera, the first transmission unit transmits the image data to the second electronic camera and/or the second transmission unit transmits the image data to the first electronic camera;

if the first electronic camera and/or the second electronic camera transmit the image data based upon the connection information for storing the image data into the server, the first transmission unit transmits the image data to the server and/or the second transmission unit transmits the image data to the server;

the first light emission element is one of an access lamp that indicates access to the first storage unit, a power supply lamp that indicates a power-supply state of the first electronic camera, a backlight of a display monitor for replaying and displaying the image data stored in the first storage unit, an auxiliary lamp for auto-focus processing of the first electronic camera, and a self-timer lamp that is used when setting photographic timing of the first image-capturing unit; and the first light emission control unit emits the optical signal converted from the network connection information from the first light emission element to the second electronic camera when a mode for connection to the network is set.

2. A data communication system in which a first electronic camera and a second electronic camera are connected together via a network, wherein the first electronic camera comprises:
a first image-capturing unit that captures an image of a photographic subject to create image data and receives light emitted from the second electronic camera;
a first storage unit that stores image data created by the first image-capturing unit and network connection information corresponding to the first electronic camera;
a first light emission element that emits light;
a first light emission control unit that converts the network connection information stored in the first storage unit into an optical signal and emits the optical signal from the first light emission element to the second electronic camera by controlling an operation of the first light emission element based upon the network connection information stored in the first storage unit;
a first information acquisition unit that acquires network connection information corresponding to the second electronic camera based upon light received by the first image-capturing unit;
a first reception unit that receives image data transmitted from the second electronic camera via the network; and
a first transmission unit that transmits image data via the network, based upon the network connection information acquired by the first information acquisition unit, and the second electronic camera comprises:
a second image-capturing unit that captures an image of a photographic subject to create image data and receives light emitted from the first electronic camera;
a second storage unit that stores image data created by the second image-capturing unit and the network connection information corresponding to the second electronic camera;
a second light emission element that emits light;
a second light emission control unit that converts the network connection information stored in the second storage unit into an optical signal and emits the optical signal from the second light emission element to the first electronic camera by controlling an operation of the second light emission element based upon the network connection information stored in the second storage unit;
a second information acquisition unit that acquires the network connection information corresponding to the first electronic camera based upon light received by the second image-capturing unit;
a second reception unit that receives image data transmitted from the first electronic camera via the network; and
a second transmission unit that transmits image data via the network, based upon the network connection information acquired by the second information acquisition unit, and wherein:

the network connection information corresponding to the first electronic camera and the network connection information corresponding to the second electronic camera each include at least connection information for transmitting and receiving the image data mutually between the first electronic camera and the second electronic camera, and connection information for storing the image data into a server;

if the first electronic camera and/or the second electronic camera transmit the image data based upon the connection information for transmitting and receiving the image data mutually between the first electronic camera and the second electronic camera, the first transmission unit transmits the image data to the second electronic camera and/or the second transmission unit transmits the image data to the first electronic camera;

if the first electronic camera and/or the second electronic camera transmit the image data based upon the connection information for storing the image data into the server, the first transmission unit transmits the image data to the server and/or the second transmission unit transmits the image data to the server;

the second light emission element is one of an access lamp that indicates access to the second storage unit, a power supply lamp that indicates a power-supply state of the second electronic camera, a backlight of a display monitor for replaying and displaying the image data stored in the second storage unit, an auxiliary lamp for auto-focus processing of the second electronic camera, and a self-timer lamp that is used when setting photographic timing of the second image-capturing unit; and the second light emission control unit emits the optical signal converted from the network connection information from the second light emission element to the first electronic camera when a mode for connection to the network is set.

3. A data communication system in which a first electronic camera and a second electronic camera are connected together via a network, wherein the first electronic camera comprises:
a first image-capturing unit that captures an image of a photographic subject to create image data and receives light emitted from the second electronic camera;
a first storage unit that stores image data created by the first image-capturing unit and network connection information corresponding to the first electronic camera;
a first light emission element that emits light;
a first light emission control unit that converts the network connection information stored in the first storage unit into an optical signal and emits the optical signal from the first light emission element to the second electronic camera by controlling an operation of the first light emission element based upon the network connection information stored in the first storage unit;

a first information acquisition unit that acquires network connection information corresponding to the second electronic camera based upon light received by the first image-capturing unit;
a first reception unit that receives image data transmitted from the second electronic camera via the network; and
a first transmission unit that transmits image data via the network, based upon the network connection information acquired by the first information acquisition unit, and the second electronic camera comprises:
a second image-capturing unit that captures an image of a photographic subject to create image data and receives light emitted from the first electronic camera;
a second storage unit that stores image data created by the second image-capturing unit and the network connection information corresponding to the second electronic camera;
a second light emission element that emits light;
a second light emission control unit that converts the network connection information stored in the second storage unit into an optical signal and emits the optical signal from the second light emission element to the first electronic camera by controlling an operation of the second light emission element based upon the network connection information stored in the second storage unit;
a second information acquisition unit that acquires the network connection information corresponding to the first electronic camera based upon light received by the second image-capturing unit;
a second reception unit that receives image data transmitted from the first electronic camera via the network; and
a second transmission unit that transmits image data via the network, based upon the network connection information acquired by the second information acquisition unit, and wherein:
the network connection information corresponding to the first electronic camera and the network connection information corresponding to the second electronic camera each include at least connection information for transmitting and receiving the image data mutually between the first electronic camera and the second electronic camera, and connection information for storing the image data into a server;
if the first electronic camera and/or the second electronic camera transmit the image data based upon the connection information for transmitting and receiving the image data mutually between the first electronic camera and the second electronic camera, the first transmission unit transmits the image data to the second electronic camera and/or the second transmission unit transmits the image data to the first electronic camera;
if the first electronic camera and/or the second electronic camera transmit the image data based upon the connection information for storing the image data into the server, the first transmission unit transmits the image data to the server and/or the second transmission unit transmits the image data to the server;
the network connection information includes a priority order for each of the connection information;
the first transmission unit and/or the second transmission unit establish, according to the priority order, connection to the network based upon the connection information for transmitting and receiving the image data mutually between the first electronic camera and the second electronic camera; and if the connection cannot be established, the first transmission unit and/or the second transmission unit establish connection to the network based upon the connection information for storing the image data into the server.

4. An electronic camera comprising:
an image-capturing unit that captures an image of a photographic subject to create image data and receives light emitted from another electronic camera;
a storage unit that stores image data created by the image-capturing unit and network connection information corresponding to the electronic camera;
a light emission element that emits light;
a light emission control unit that converts the network connection information stored in the storage unit into an optical signal and emits the optical signal from the light emission element to the other electronic camera by controlling an operation of the light emission element based upon the network connection information stored in the storage unit;
an information acquisition unit that acquires network connection information corresponding to the other electronic camera based upon light received by the image-capturing unit;
a reception unit that receives image data transmitted from the other electronic camera via the network; and
a transmission unit that transmits image data via the network, based upon the network connection information acquired by the information acquisition unit, and
wherein:
the network connection information corresponding to the electronic camera and the network connection information corresponding to the other electronic camera each includes at least connection information for transmitting and receiving the image data mutually between the electronic camera and the other electronic camera, and connection information for storing the image data into a server;
if the electronic camera transmits the image data based upon the connection information for transmitting and receiving the image data mutually between the electronic camera and the other electronic camera, the transmission unit transmits the image data to the other electronic camera;
if the electronic camera transmits the image data based upon the connection information for storing the image data into the server, the transmission unit transmits the image data to the server;
the light emission element is one of an access lamp that indicates access to the storage unit, a power supply lamp that indicates a power-supply state of the electronic camera, a backlight of a display monitor for replaying and displaying the image data stored in the storage unit, an auxiliary lamp for auto-focus processing of the electronic camera, and a self-timer lamp that is used when setting photographic timing of the image-capturing unit; and
the light emission control unit emits the optical signal converted from the network connection information from the light emission element to the other electronic camera when a mode for connection to the network is set.

5. An electronic camera comprising:
an image-capturing unit that captures an image of a photographic subject to create image data and receives light emitted from another electronic camera;

a storage unit that stores image data created by the image-capturing unit and network connection information corresponding to the electronic camera;

a light emission element that emits light;

a light emission control unit that converts the network connection information stored in the storage unit into an optical signal and emits the optical signal from the light emission element to the other electronic camera by controlling an operation of the light emission element based upon the network connection information stored in the storage unit;

an information acquisition unit that acquires network connection information corresponding to the other electronic camera based upon light received by the image-capturing unit;

a reception unit that receives image data transmitted from the other electronic camera via the network; and a transmission unit that transmits image data via the network, based upon the network connection information acquired by the information acquisition unit, and wherein:

the network connection information corresponding to the electronic camera and the network connection information corresponding to the other electronic camera each includes at least connection information for transmitting and receiving the image data mutually between the electronic camera and the other electronic camera, and connection information for storing the image data into a server;

if the electronic camera transmits the image data based upon the connection information for transmitting and receiving the image data mutually between the electronic camera and the other electronic camera, the transmission unit transmits the image data to the other electronic camera;

if the electronic camera transmits the image data based upon the connection information for storing the image data into the server, the transmission unit transmits the image data to the server;

the network connection information includes a priority order for each of the connection information;

the transmission unit establishes, according to the priority order, connection to the network based upon the connection information for transmitting and receiving the image data mutually between the electronic camera and the other electronic camera; and if the connection cannot be established, the transmission unit establishes connection to the network based upon the connection information for storing the image data into the server.

* * * * *